(12) United States Patent
Montena

(10) Patent No.: US 7,717,725 B2
(45) Date of Patent: May 18, 2010

(54) SEALING ASSEMBLY FOR A CABLE CONNECTING ASSEMBLY AND METHOD OF JOINING CABLE CONNECTORS

(75) Inventor: Noah Montena, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 64 days.

(21) Appl. No.: 12/011,165

(22) Filed: Jan. 24, 2008

(65) Prior Publication Data
US 2009/0191752 A1    Jul. 30, 2009

(51) Int. Cl.
*H01R 13/52*    (2006.01)
(52) U.S. Cl. ..................... 439/277; 439/322
(58) Field of Classification Search .......... 439/322, 439/584, 587, 595, 594, 489, 271, 320, 277
See application file for complete search history.

(56) References Cited

U.S. PATENT DOCUMENTS

| | | | |
|---|---|---|---|
| 4,601,497 A * | 7/1986 | Bartholomew | ............... 285/319 |
| 4,902,246 A | 2/1990 | Samchisen | |
| 5,011,432 A | 4/1991 | Sucht et al. | |
| 5,295,864 A | 3/1994 | Birch et al. | |
| 5,340,332 A | 8/1994 | Nakajima et al. | |
| 5,470,257 A | 11/1995 | Szegda | |
| 5,571,028 A | 11/1996 | Szegda | |
| 5,586,910 A | 12/1996 | Del Negro et al. | |
| 5,997,350 A | 12/1999 | Burris et al. | |
| 6,019,636 A | 2/2000 | Langham | |
| 6,034,325 A | 3/2000 | Nattel et al. | |
| 6,089,912 A | 7/2000 | Tallis et al. | |
| 6,679,724 B2 * | 1/2004 | Hillman et al. | ............. 439/489 |
| D504,113 S | 4/2005 | Montena | |
| 7,097,500 B2 | 8/2006 | Montena | |
| 7,128,603 B2 | 10/2006 | Burris et al. | |
| 7,207,820 B1 | 4/2007 | Montena | |
| 7,264,503 B2 | 9/2007 | Montena | |
| 7,458,851 B2 * | 12/2008 | Montena | ..................... 439/584 |
| 2004/0082218 A1 * | 4/2004 | Stirling | ..................... 439/587 |

* cited by examiner

*Primary Examiner*—Neil Abrams
*Assistant Examiner*—Phuong Nguyen
(74) *Attorney, Agent, or Firm*—Wood, Phillips, Katz, Clark & Mortimer

(57) ABSTRACT

A sealing assembly operatively attached to a coaxial cable connector that is attached to an RF port. The sealing assembly has a sealing subassembly, that is changeable between a pre-assembled state and a sealing state, and at least one actuator component. The sealing subassembly has a sealing portion. Advancement of the actuator component changes the sealing subassembly from the pre-assembled state into the sealing state and thereby causes the sealing portion to compress radially against the RF port.

23 Claims, 15 Drawing Sheets

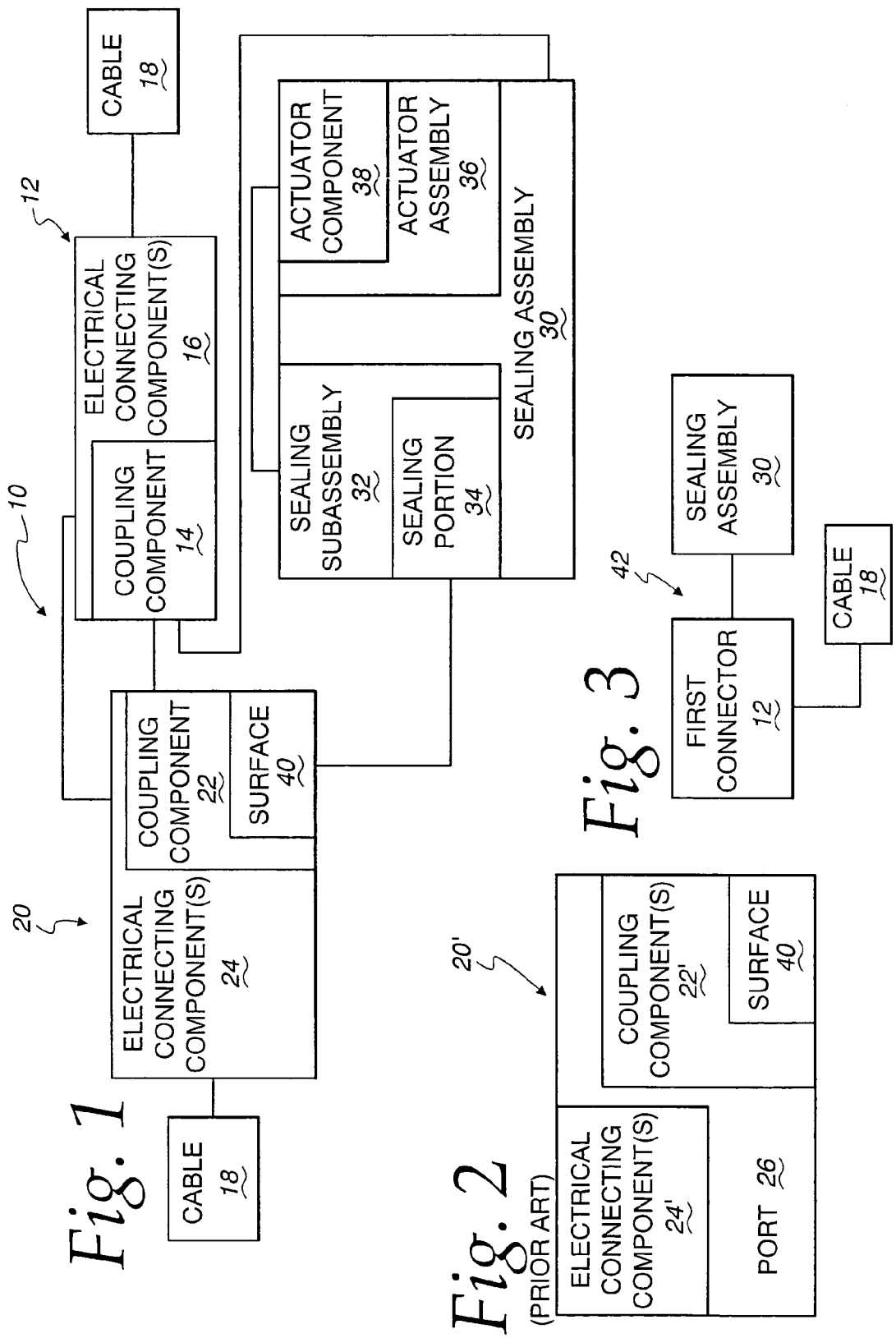

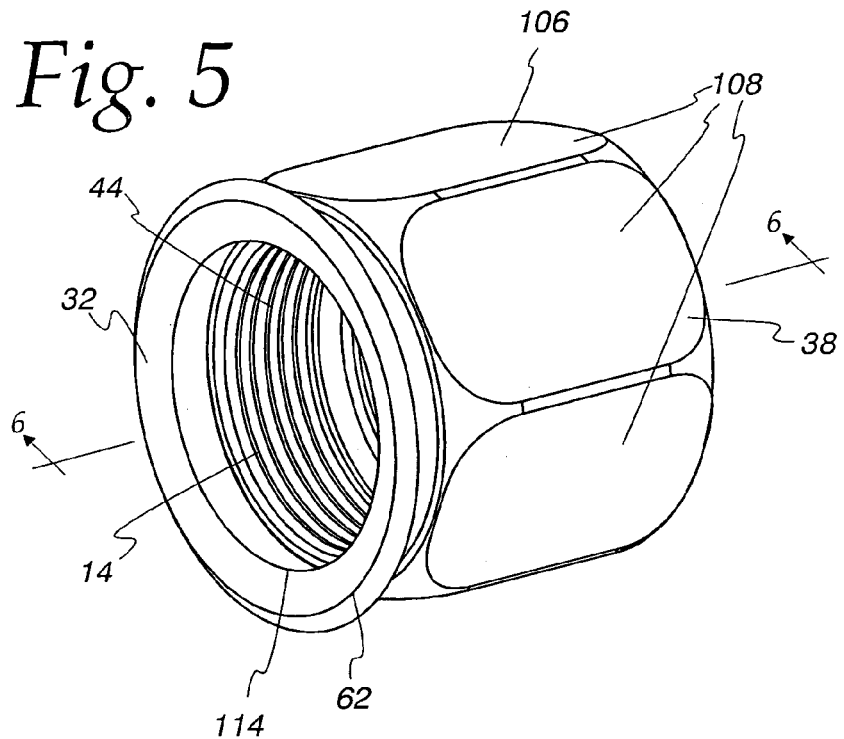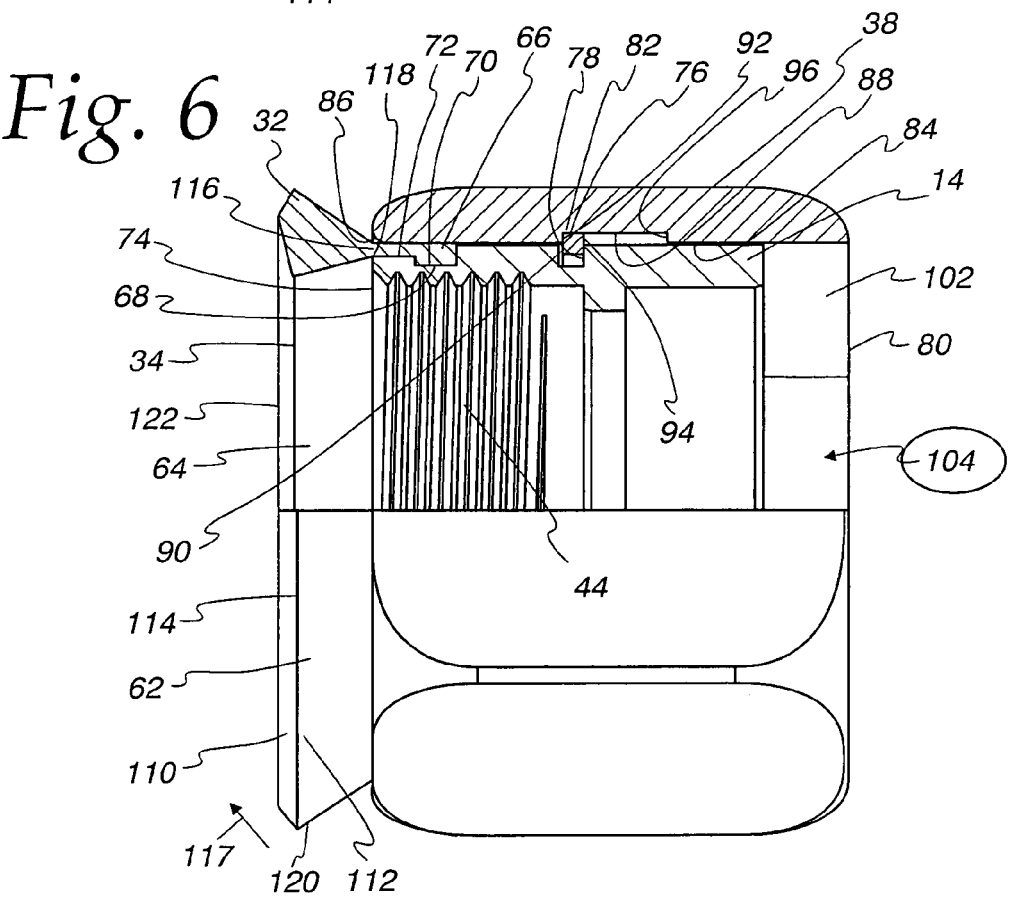

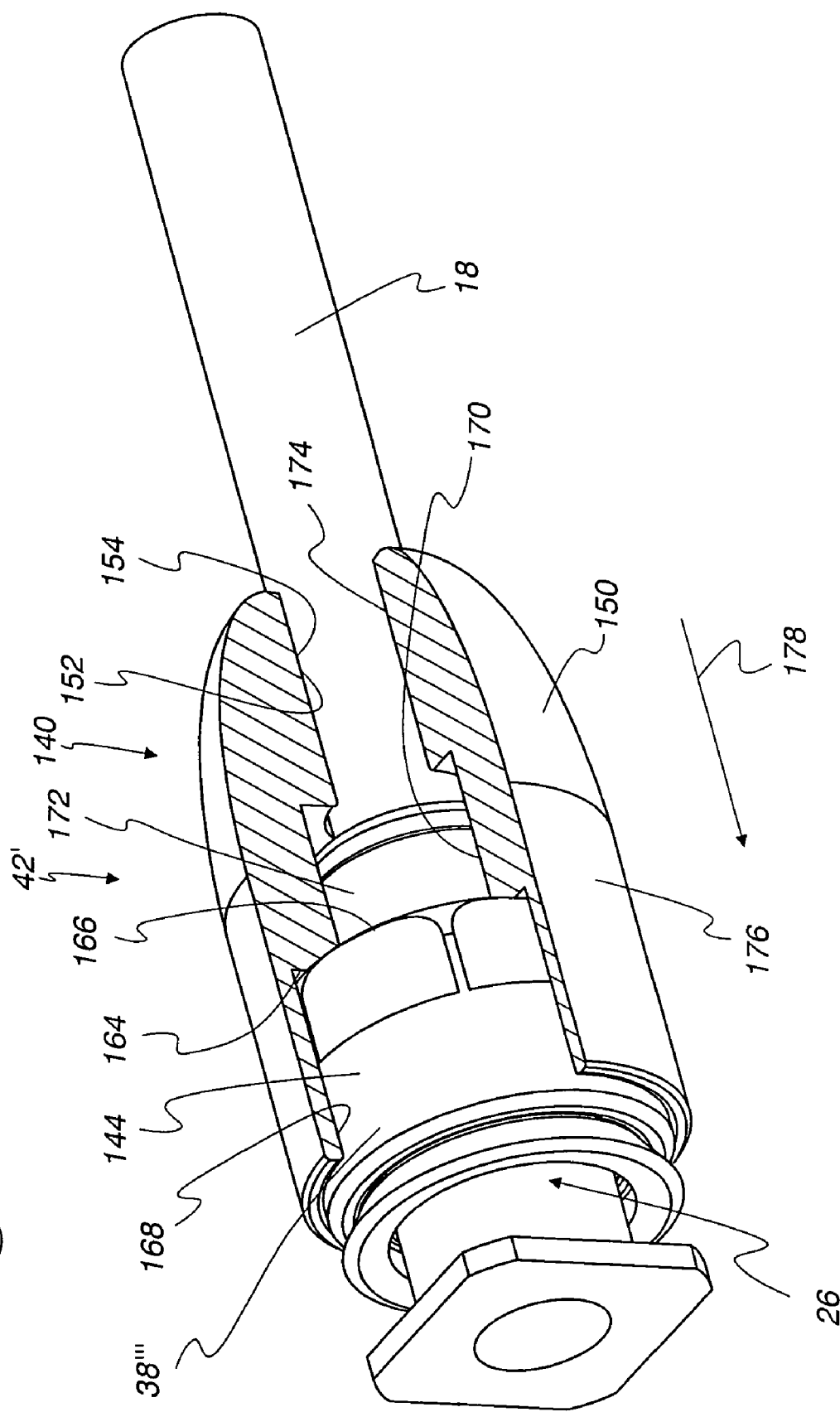

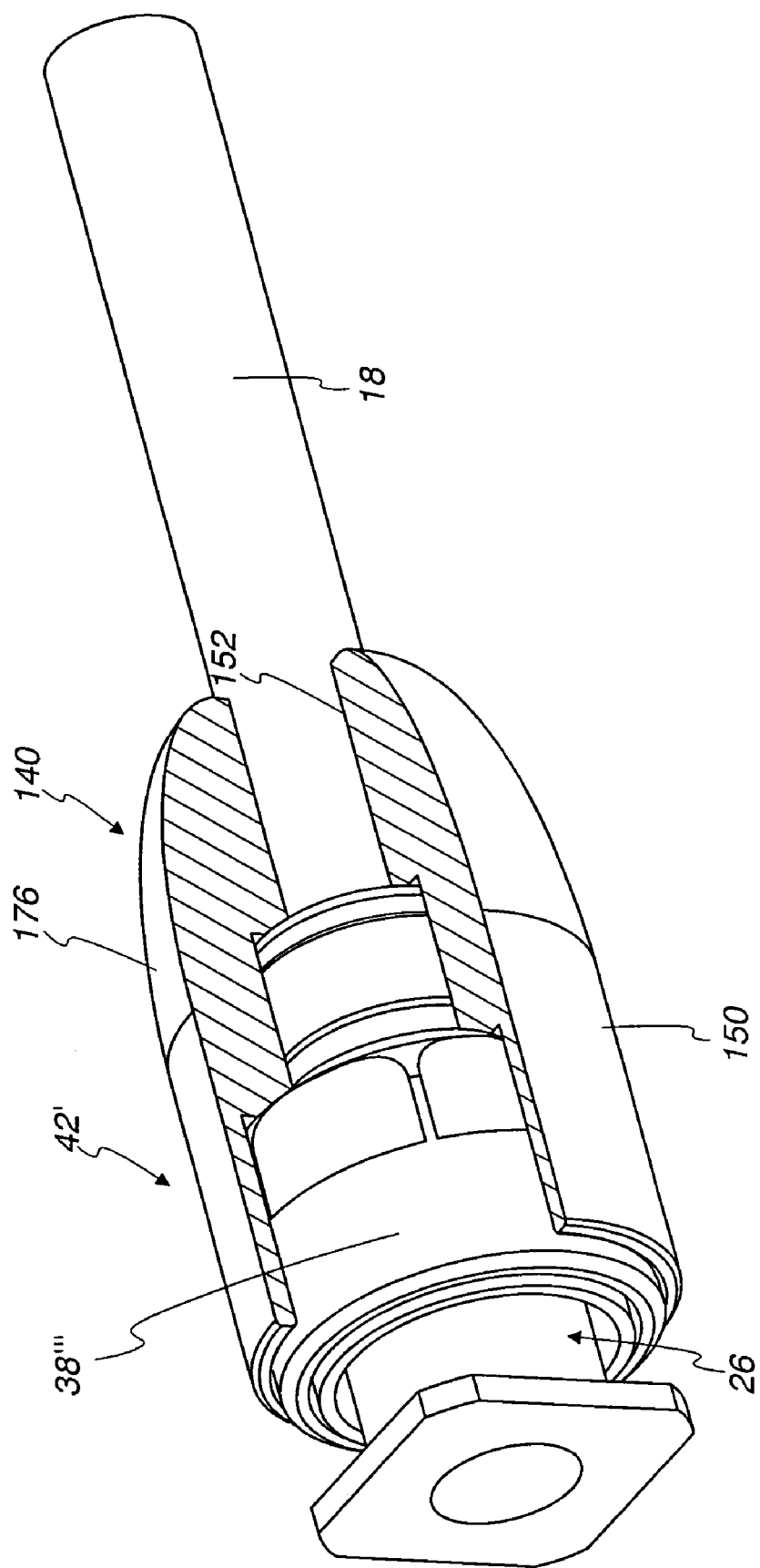

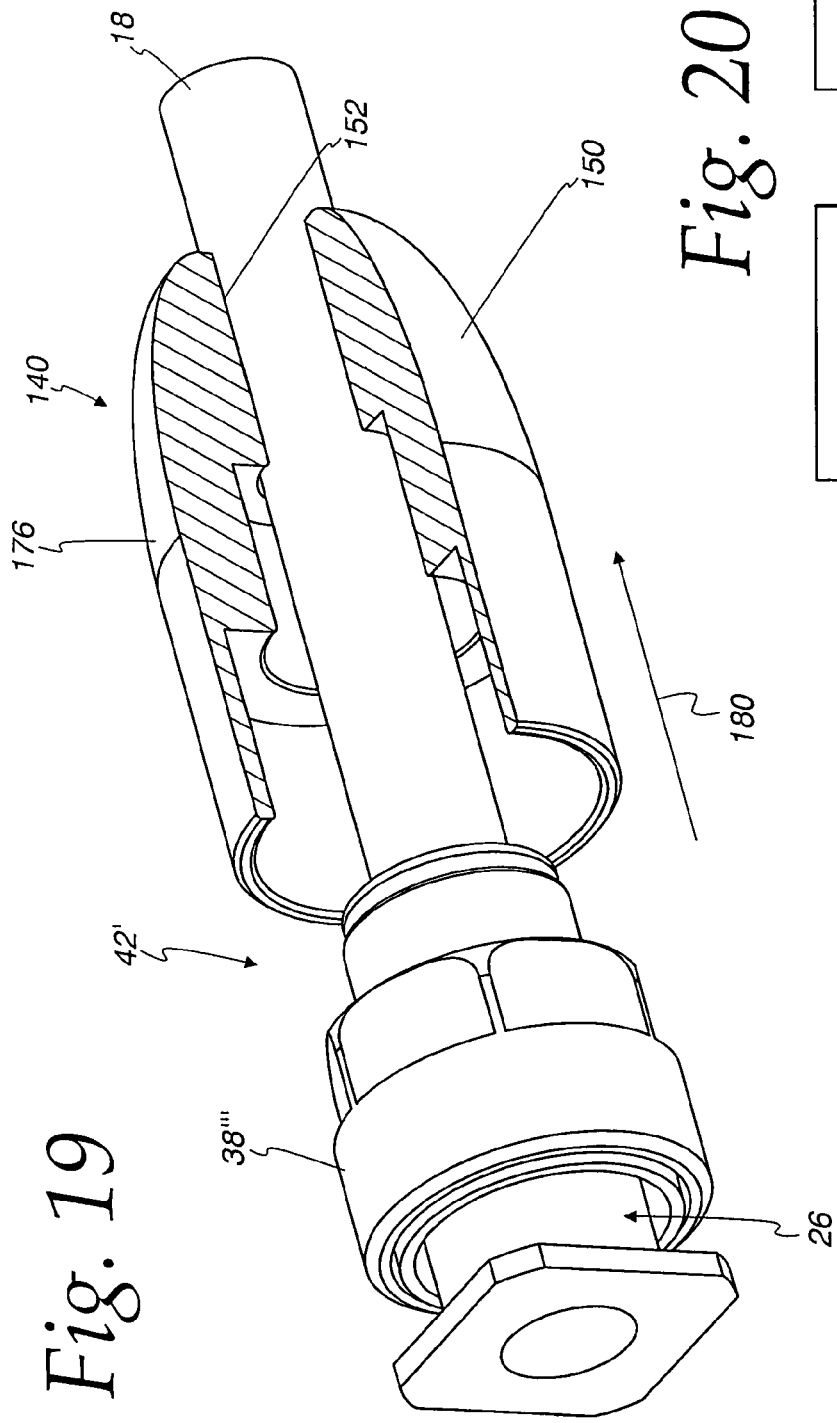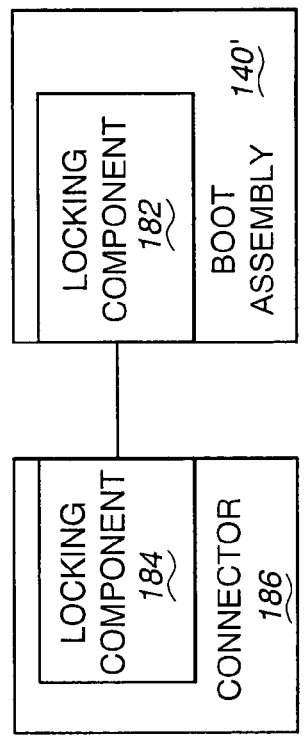

SEALING ASSEMBLY FOR A CABLE CONNECTING ASSEMBLY AND METHOD OF JOINING CABLE CONNECTORS

BACKGROUND OF THE INVENTION

1. Field of the Invention

This invention relates to connecting assemblies for cable, such as coaxial cable and, more particularly, to a sealing assembly for the connecting assemblies to avoid ingress of moisture and foreign matter between connectors on the connecting assemblies. The invention is also directed to a method of joining separate connectors.

2. Background Art

Cable connectors are used in many different industries and for a multitude of different applications. Coaxial cable is used extensively in the communications industry. Coaxial cable ends are commonly required to be connected to other lengths of cables, or at ports or other connecting locations, to establish electrical continuity at the connecting locations.

It is important in most applications that there be no migration of moisture between components at a connecting location as might compromise, or cause a failed, signal. At the same time, this migration of moisture may cause a progressive degradation of the components which may affect signal quality and/or inhibit, or eventually prohibit, the separation of the connectors, when this becomes necessary.

The cable industry has long been aware of the importance of sealing connections at locations that are prone to admitting moisture. A multitude of different sealing arrangements have been developed by those in the cable industry and other industries to avoid the above problems. Many such sealing arrangements, while potentially effective, are compromised by reason of improper installation, or their omission, by an installer.

Cable installation is particularly competitive, given the number of entities vying for business. Consequently, margins are generally low. Thus sealing assemblies are generally designed so that they will be cost effective both from a manufacturing standpoint and from the standpoint of installation.

Reliability of the sealing assemblies, however, is of the utmost importance since return visits necessitated by ineffective sealing may have a significant, if not devastating, financial impact on an installer.

Under normal conditions, if a sealing assembly is difficult or time consuming to install, shortcuts might be taken that result in an ineffectively sealed installation. In an extreme case, the sealing assembly may be altogether left off in the interest of convenience and time savings. This is particularly true in harsh, outdoor conditions in which installers may be required to perform. Aside from the ongoing time pressures, and high volume expectations, installers may be faced with the difficulty of effecting installations using gloves.

In spite of there being a multitude of different sealing assemblies currently in existence, it is still common to see shortcuts taken by installers that bypass specified procedures.

The above problems are aggravated by the variations in connector component constructions that do not allow standardization of sealing assemblies. As an example, the wireless industry has devised a number of equipment ports for outdoor use which do not provide for conventional, reliable seals, such as those using O-rings, and the like. There is generally little standardization of components other than those directly related to signal transmission properties and secure contact.

Consequently, it is not uncommon to see make-shift sealing accomplished at such connections. For example, sealing tape is commonly wrapped copiously over outdoor connections. This process may be expensive in terms of material and labor costs and also is largely ineffective. Given that most failures of power equipment result from moisture ingress, this ineffective sealing accounts for compromised signals, and potentially failures that necessitate return visits and burdensome repair work.

Since it is not practical to closely supervise all installers, the industry continues to contend with the above problems. The industry continues to search however for a seal design that will not impede or lengthen the installation process and that will be consistently used and reliably seal critical connection locations.

SUMMARY OF THE INVENTION

One form of the invention is directed to a sealing assembly for a coaxial cable connector, the connector having at one end a threaded nut for removable attachment to an RF port. The sealing assembly has a sealing subassembly changeable between a pre-assembled state and a sealing state. The sealing subassembly has at one end an engagement portion and at its other end a sealing portion. The engagement portion is mounted to the nut. An actuator is mounted on an external surface of the nut. Axial advancement of the actuator changes the sealing subassembly from the pre-assembled state into the sealing state and thereby causes the sealing portion to compress radially inwardly around the RF port.

In one form, the sealing subassembly has a hinge at which the sealing subassembly can bend to cause a first part of the sealing subassembly, on which the sealing portion is defined, to move radially inwardly relative to a second part of the sealing subassembly, on which the engagement portion is defined, as the sealing subassembly is changed from the pre-assembled state into the sealing state.

In one form, there are cooperating connecting parts on the second part of the sealing subassembly and nut that allow the sealing subassembly and nut to be press fit, and maintained, together.

In one form, the actuator is moved axially along a central axis between first and second positions to change the sealing subassembly from the pre-assembled state into the sealing state. The actuator and nut are maintained together and are movable relative to each other axially to allow the actuator component to be changed between the first and second positions.

In one form, the nut and actuator are keyed to each other to limit relative movement between the nut and actuator around the central axis, thereby allowing the actuator to be turned around the central axis to thereby turn the nut around the central axis.

In one form, the actuator surrounds the first part of the sealing subassembly so that the first part of the sealing subassembly is captive between the actuator and a radially outwardly facing surface on the RF port.

In one form, the radially outwardly facing surface has a first diameter and the sealing portion has a second diameter that is greater than the first diameter with the sealing subassembly in the pre-assembled state. The sealing portion can be moved axially relative to the radially outwardly facing surface without any interference between the sealing portion and radially outwardly facing surface with the sealing subassembly in the pre-assembled state.

In one form, the actuator is moved axially between first and second positions to change the sealing subassembly from the pre-assembled state into the sealing state. The connecting assembly further has a boot assembly that is engagable with the actuator and manipulable to thereby move the actuator from the first position into the second position.

In one form, the boot assembly is configured to sealingly receive a part of the actuator and seal directly against and around a cable connected to the connector.

In one form, the sealing portion has a surface bounded by a radially outwardly opening "V" with the sealing subassembly viewed in cross section.

In one form, the sealing portion is provided in combination with a coaxial cable length operatively connected to the connector.

In one form, the nut and actuator are guided one against the other as the actuator is moved relative to the nut between the first and second positions and there are one of: a) cooperating threads on the nut and actuator that allow the nut and actuator to be turned relative to each other around the central axis to effect relative axial movement therebetween; and b) cooperating surfaces on the nut and actuator through which the nut and actuator can be guided slidingly against each other in a straight line generally parallel to the central axis.

In another form, a sealing assembly is provided for a connecting assembly having a first connector that can be electrically connected to a first length of coaxial cable and having a central axis. The first connector includes an internally threaded nut that can be engaged with external threads on a second connector to establish electrical connection between a first length of coaxial cable electrically connected to the first connector and one of: a) a second length of coaxial cable; or b) a port defined by the second connector. The sealing assembly has a sealing subassembly that is changeable between pre-assembled and sealing states and defines a sealing portion. The sealing assembly further includes an actuator assembly with an actuator component that is movable guidingly axially relative to the first nut between first and second positions. The actuator component, as an incident of moving between the first and second positions, changes the sealing subassembly from the pre-assembled state into the sealing state by bending a part of the sealing subassembly, and thereby changing an effective diameter of the sealing portion, that is engageable with a radially outwardly facing surface on a second connector to which the first connector is joined.

In one form, the sealing assembly includes a hinge at which the sealing subassembly bends to cause a first part of the sealing subassembly, on which the sealing portion is defined, to move radially inwardly relative to a second part of the sealing subassembly, as the sealing subassembly is changed from the pre-assembled state into the sealing state.

In one form, the nut and actuator component are keyed to each other to limit relative movement between the nut and actuator component around the central axis, thereby allowing the actuator component to be turned around the central axis and to thereby turn the nut around the central axis to facilitate threaded engagement of the nut with a second connector.

In one form, there are cooperating connecting parts on the sealing subassembly and nut that allow the sealing subassembly and nut to be press fit, and maintained, together.

In one form, the sealing portion has a surface bounded by a radially outwardly opening "V" with the sealing subassembly viewed in cross section.

In one form, the nut and actuator component are guided one against the other as the actuator component is moved relative to the nut between the first and second positions and there are one of: a) cooperating threads on the nut and actuator component that allow the nut and actuator components to be turned relative to each other around the central axis to effect relative axial movement therebetween; and b) cooperating surfaces on the nut and actuator component through which the nut and actuator component can be guided slidingly against each other in a straight line generally parallel to the central axis.

In one form, the connecting assembly further includes a boot assembly that is engageable with the actuator component and manipulable to thereby move the actuator component relative to the nut from the first position into the second position.

In one form, the boot assembly is configured to sealingly receive a part of the actuator component and seal directly against and around a first length of coaxial cable electrically connected to the first connector.

In another form, the invention is directed to a connecting assembly for cable. The connecting assembly has a first connector that can be electrically connected to a first length of coaxial cable and has a central axis. The first connector has an internally threaded nut that can be engaged with external threads on a second connector to establish electrical connection between a first length of coaxial cable electrically connected to the first connector and one of: a) a second length of coaxial cable; or b) a port defined by the second connector. Reconfigurable structure seals around a radially outwardly facing surface on a second connector to which the first connector is joined.

In one form, the reconfigurable structure has a sealing subassembly having a sealing portion. Structure is provided, cooperating between the nut and a part of the sealing subassembly, for press fitting and thereby maintaining the first connector and sealing subassembly together with the nut surrounding at least a part of the sealing subassembly.

In another form, the invention is directed to a method of joining first and second connectors. The method includes the steps of: providing a first connector with a first cable length operatively connected thereto; providing a second connector with a central axis and a radially outwardly facing surface; providing a sealing assembly; joining the first and second connectors together into a preliminary joined state; changing the relationship of the first and second connectors to a joined operative state wherein the first and second connectors are secured together; and changing the actuator component from a first position into a second position and thereby causing a part of the sealing subassembly to bend to thereby cause a sealing portion on the part of the sealing subassembly to be reduced from a first effective diameter to a second effective diameter, smaller than the first effective diameter, thereby to bring the sealing portion from a radially spaced relationship into sealing engagement with the radially outwardly facing surface.

In one form, the second connector has an effective outer diameter along an axial extent over which the sealing portion passes as the first and second connectors are changed from a separated state into the joined operative state and with the actuator in the first position the first effective diameter of the sealing portion is greater than the effective outer diameter of the second connector over the entire axial extent.

In one form, the actuator component is changed from the first position into the second position after the first and second connectors are changed into the joined operative state.

BRIEF DESCRIPTION OF THE DRAWINGS

FIG. 1 is a schematic representation of one form of connecting assembly, including first and second connectors for mechanically and electrically connecting separate cable lengths, and incorporating a sealing assembly, according to the present invention;

FIG. 2 is a schematic representation of a conventional connector, defining a port, to which a connecting assembly, consisting of one of the connectors and sealing assembly in FIG. 1, can be joined;

FIG. 3 is a schematic representation of a connecting assembly, of the type that can be joined to the connector in FIG. 2, including one connector together with the inventive sealing assembly, that is joined to a cable length;

FIG. 5 is an enlarged, perspective view of the components in FIG. 4 in an assembled state and with the sealing subassembly in a pre-assembled state;

FIG. 6 is an enlarged, partial, cross-sectional view of the assembled components of FIG. 5 taken along line 6-6 therein;

FIG. 17 is a view as in FIG. 16 wherein the boot assembly has been moved axially to an assembly position against the actuator/actuator component;

FIG. 18 is a view as in FIG. 17 wherein the boot assembly has been axially moved to reposition the actuator/actuator component to thereby change the sealing assembly from its pre-assembled state into its sealing state;

FIG. 19 is a view as in FIG. 18 wherein the boot assembly has been moved axially away from the FIG. 18 position to expose the connected components;

FIG. 20 is a schematic representation of the connector with which the boot assembly is associated, and with optional cooperating locking components to maintain the boot assembly in the FIG. 18 position.

DETAILED DESCRIPTION OF THE DRAWINGS

Figure 4:
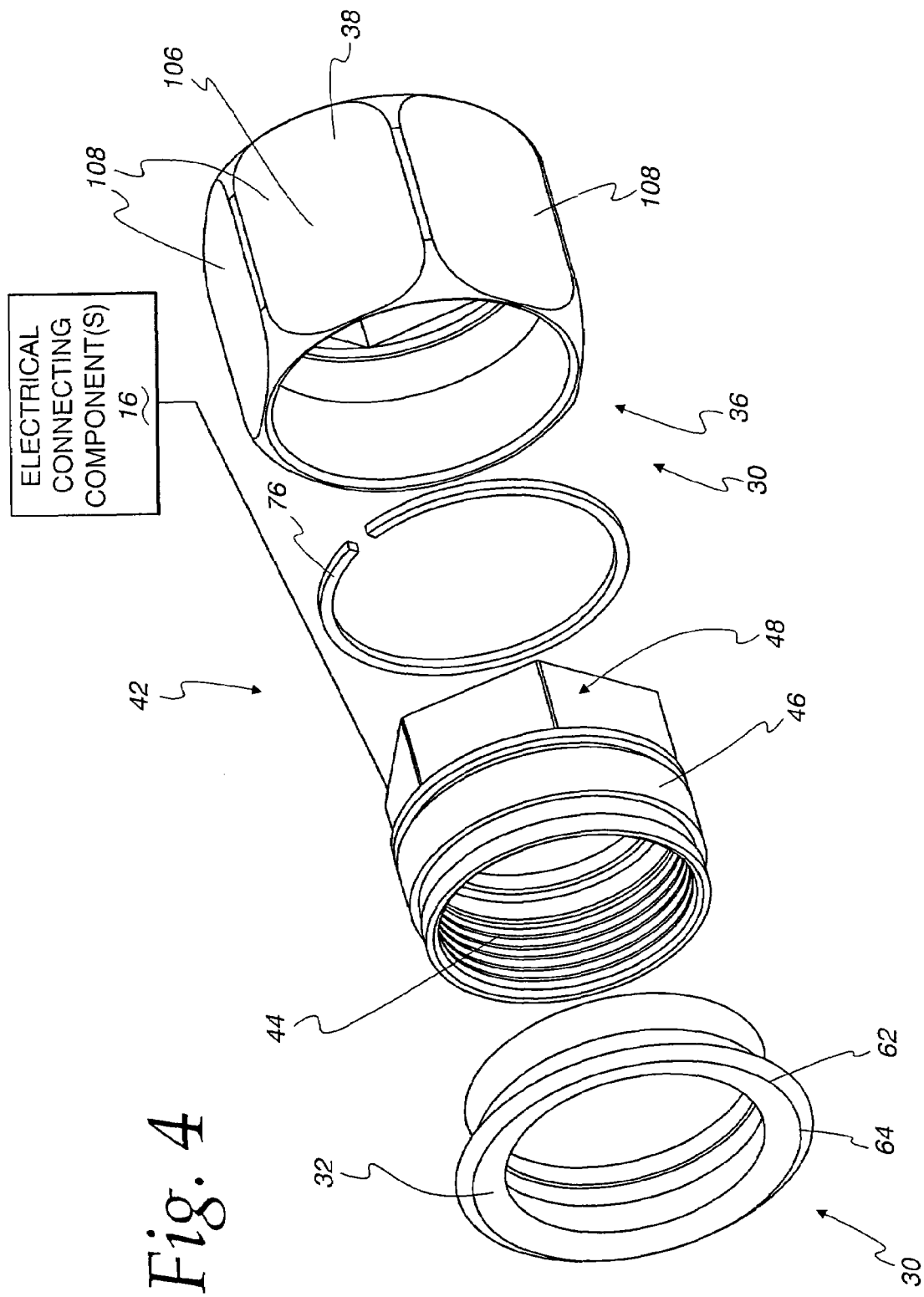
FIG. 4 is an exploded, perspective view of one exemplary form of the connecting assembly in FIG. 3, with the sealing assembly consisting of a sealing subassembly and an actuator/actuator component that cooperate with a coupling component in the form of a nut.
Figure 7:
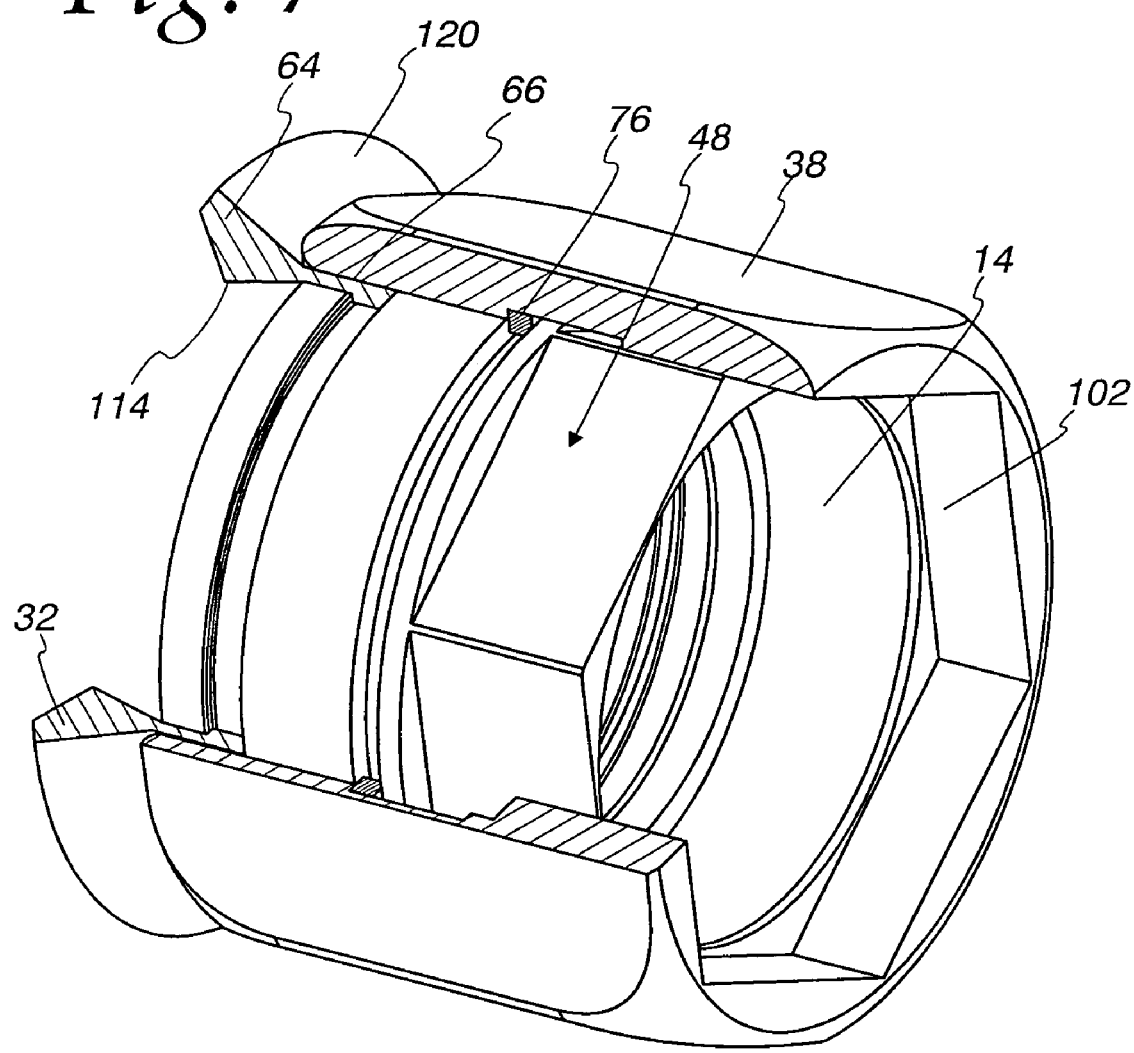
FIG. 7 is a view as in FIG. 6 from a different perspective.

In one form of the invention, a connecting assembly is provided for cable, as shown at 10 in FIG. 1. The connecting assembly 10 consists of a first connector 12, made up of a coupling component 14 and at least one electrical connecting component 16, that is operatively joined to a length of cable 18.

The connecting assembly 10 consists additionally of a second connector 20 having a coupling component 22 that is mechanically connected to the coupling component 14. The second connector 20 additionally has at least one electrical connecting component 24 that cooperates with the electrical connecting component(s) 16 on the first connector 12, to define at least one conductive path through the joined first and second connectors 12, 20. In FIG. 1, the second connector 20 is operatively joined to a second length of cable 18.

Alternatively, as shown in FIG. 2, a corresponding, conventional, second connector 20' may define a port 26, such as an RF port, with the same type of removable coupling component 22' as at 22 in FIG. 1, and a corresponding electrical connecting component(s) 24'.

The environment in FIGS. 1 and 2 is shown schematically since the invention is contemplated for use at any site whereat connectors are mechanically/electrically connected and where there is the potential for ingress of moisture and/or other foreign matter between the connectors as might compromise signal performance or system operation.

The inventive connecting assembly 10 of FIG. 1 includes a sealing assembly 30, that cooperates with the coupling component 14, and consists of a sealing subassembly 32 with a sealing portion 34, and an actuator assembly 36 with at least one actuator/actuator component 38. The sealing subassembly 32 is changeable between pre-assembled and sealing states. The actuator component 38 is movable guidingly along a central axis of the connecting assembly 10 relative to the joined first and second connectors 12, 20 between first and second positions. As the actuator component 38 is advanced from its first position into its second position, the sealing subassembly 32 is changed from its pre-assembled state into its sealing state by causing the sealing portion 34 of the sealing subassembly 32 to be moved radially inwardly to be placed sealingly against and around a radially outwardly facing surface 40 on the second connector 20, preferably by being compressed radially inwardly.

As seen in FIG. 3, the sealing assembly 30 may be made available in conjunction with the first connector 12 as a separate, combined connecting assembly 42, that may be mechanically and electrically connected to the cable 18 and joined to: a) the second connector 20, as shown in FIG. 1; b) the second connector as shown at 20' in FIG. 2; or c) any other type of connector as might be used in the industry and at which sealing is desired.

The invention is concerned primarily with the mechanical coupling aspects of the connecting assemblies 10, 42. The nature of the cable 18 and the electrical connecting components 16, 24, 24' is not critical to the present invention and will not be described in detail herein. Myriad different types of cable are electrically joined to connectors in many different industries and for many different applications therewithin. Details of one exemplary electrical connecting component for coaxial cable are shown in U.S. Pat. No. 6,153,830, which is incorporated herein by reference.

In FIGS. 4-12, one specific form of the connecting assembly 42 is shown, both separately and as part of an overall connecting assembly at 10', corresponding to the connecting assembly 10 in FIG. 1, wherein the first connector 12 on the connecting assembly 42 is joined to the second connector 20' defining the port 26 and having the associated electrical component(s) 24'. It should be understood that this is but one exemplary form of the invention, as variations thereof, only some of which are set forth below, are contemplated.

The first connector 12 consists of the coupling component 14, in this case in the form of a nut with internal threads 44 at one end of the first connector 12, together with the electrical connecting component(s) 16. The nut 14 has a generally cylindrical body 46 with a polygonally-shaped outer surface portion 48 that facilitates tightening and loosening, as with a conventional wrench. The nut 14 is thus removably attached through the threads, as to the port 26, or any other threaded location at which an electrical and mechanical connection is to be made.

The sealing assembly 30 consists of the sealing subassembly 32 and the actuator assembly 36, consisting potentially of multiple components, but in this case of a generally annular actuator/actuator component 38 mounted on an external surface of the nut 14. The sealing subassembly 32 and actuator assembly 36 define a reconfigurable means for sealing around the surface 40.

The components making up the connecting assembly 42 can be pre-assembled preparatory to joining the connecting assembly 42 to the cable 18 and to the second connector 20'.

Figure 8:
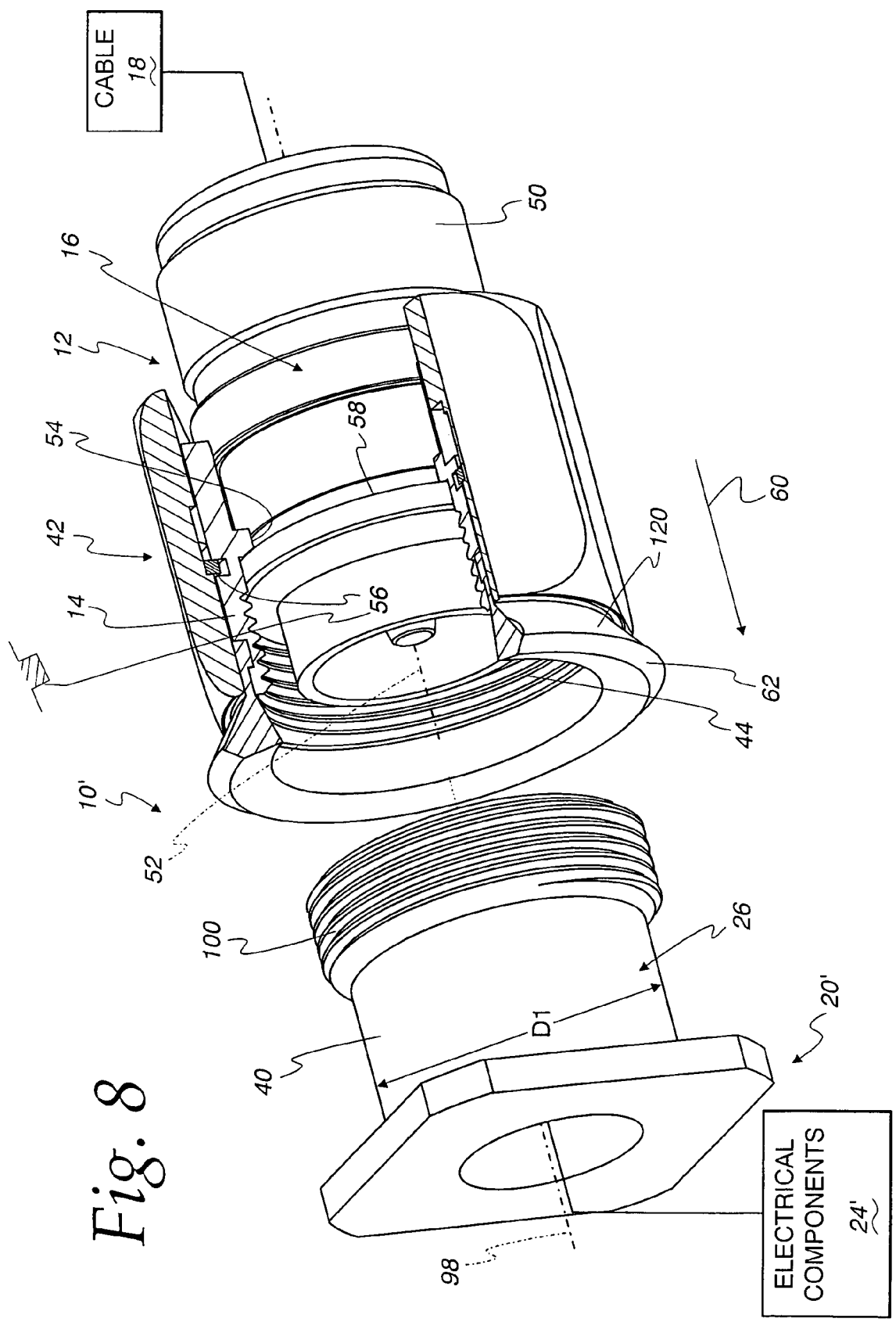
FIG. 8 is an enlarged, partially broken away, perspective view of the connecting assembly in FIG. 4 with a connector thereon and a separate connector defining a cooperating port, and with the connectors in a separated state and with the sealing subassembly in the pre-assembled state.
Figure 9:
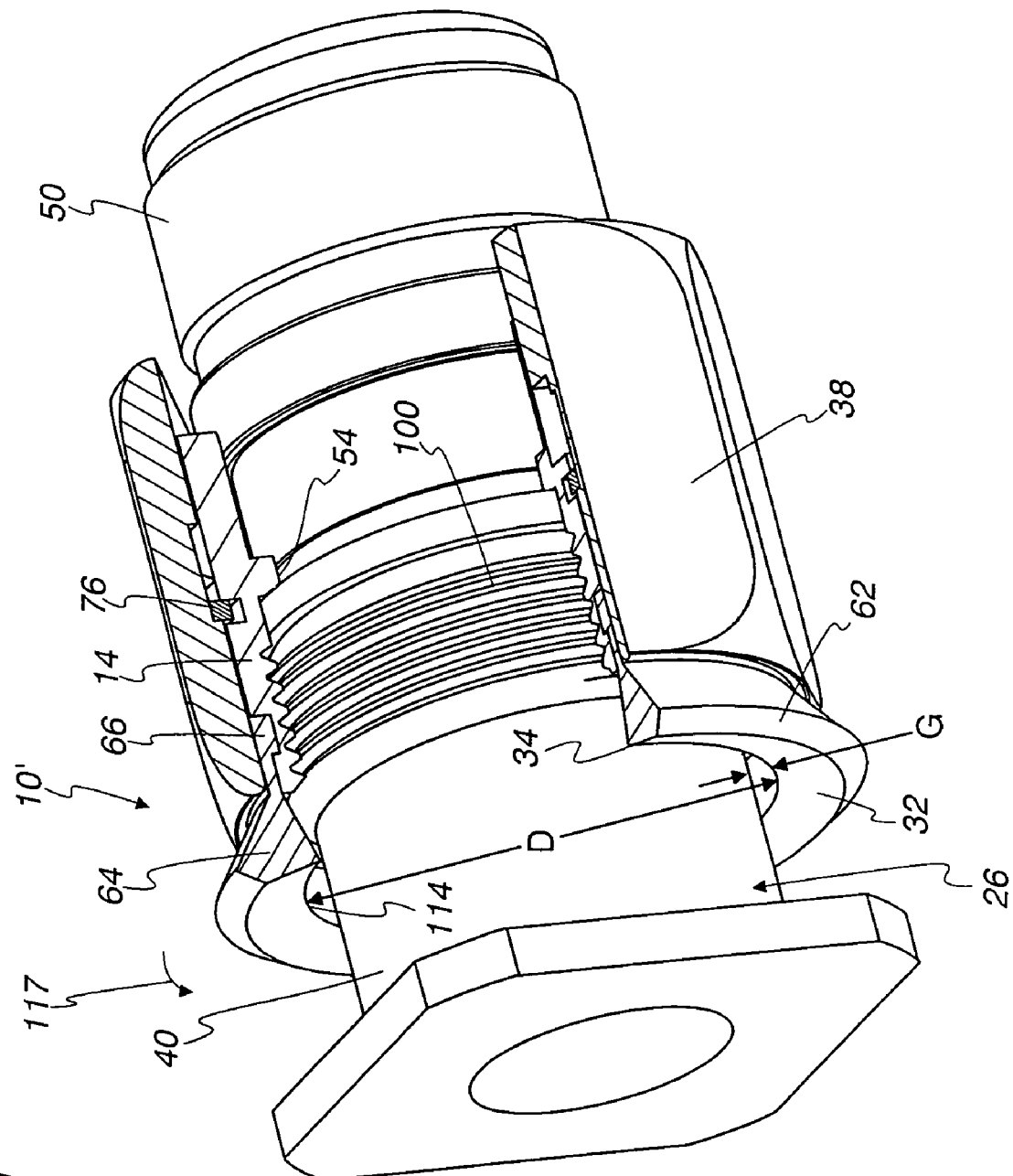
FIG. 9 is a view as in FIG. 8 wherein the connectors are threadably joined and the sealing subassembly is in the pre-assembled state.

In this embodiment, the electrical connecting component (s) 16, as shown in FIGS. 8 and 9, has a tubular body 50 with a central axis 52 that coincides with the central axes of the connecting assembly 42 and the connecting subassembly 10'. The nut 14 surrounds the body 50 and has a radially inwardly projecting, annular bead 54 with an axially facing shoulder 56 that abuts to a shoulder 58 on the body 50. Through this arrangement, tightening of the nut 14 upon the port 26 causes the shoulder 56 to bear upon the shoulder 58 and thereby urge the connecting component(s) 16 in the direction of the arrow 60 in FIG. 8 into positive electrical contact with the electrical component(s) 24' on the second connector 20'.

The sealing subassembly 32 has a ring-shaped body 62 with a first part 64 defining the aforementioned sealing portion 34 and at its other end a second part 66, defining an engagement portion, that is joined to a part of the connector 12, and in this case mounted to the nut 14. There are connecting parts on the second part 66 and nut 14, respectively in the form of an annular, radially inwardly projecting bead 68, and a complementary, radially outwardly opening annular recess 70, that cooperate to allow the second part 66 of the sealing subassembly 32 and nut 14 to be press fit, and maintained, together. To allow this interaction, the second part 66 of the sealing subassembly 32, and more preferably the entire sealing subassembly 32, is made from a resilient material with good sealing properties, such as an elastomeric material.

By aligning the sealing subassembly 32 and nut 14 in coaxial relationship as in FIG. 4, and pressing the sealing subassembly 32 and nut 14 axially towards, and against, each other from the separated relationship shown in FIG. 4, the second part 66 can be stretched radially outwardly over the nut surface 72 at the nut end 74. Once the bead 68 and recess 70 are moved into axial coincidence, the second part 66 tends towards it undeformed state, whereupon the annular bead 68 is drawn into the recess 70 to remain seated therewithin. The second part 66 and recess 70 together define a means, cooperating between the nut 14 and sealing subassembly 32, for press-fitting, and thereby maintaining, the connector 12 and sealing subassembly 32 together with the nut 14 surrounding at least a part of the sealing subassembly 32.

A split retaining ring 76 is seated in an annular undercut 78 through the nut surface 72 at an axial midportion between the nut end 74 and an opposite end 80. The ring 76 is dimensioned to be deformable into the undercut 78 whereupon an outer surface 82 thereon is substantially flush with the nut surface 72 in the vicinity of the undercut 78.

With the retaining ring 76 in place, the actuator component 38 can be directed from the separated position in FIG. 4 axially towards the nut 14 with the preassembled sealing subassembly 32. The annular inside surface 84 of the actuator component 38 has a diameter slightly greater than that of the nut surface 72. As a rounded, leading edge 86 of the actuator component 38 encounters, and continues to move relative to, the retaining ring 76, the retaining ring 76 becomes progressively wedged into the undercut 78 to allow passage of the leading edge 86 therepast.

With the actuator component 38 in the first position therefor, as in FIG. 6, the retaining ring 76 registers with an elongate, radially outwardly recessed, receptacle 88 through the surface 84. The receptacle 88 has a radial dimension that allows the retaining ring 76 to spring outwardly, under restoring forces imparted by radially inward deformation, so as to secure the actuator component 38 and nut 14 against separation. More specifically, with the actuator component 38 in its first position, as seen in FIGS. 6-9, an axially facing shoulder 90 on the retaining ring 76 confronts an axially oppositely facing shoulder 92 bounding the receptacle 88. This precludes separation of the actuator component 38 and nut 14 by reversal of the aforementioned assembly steps.

An oppositely facing shoulder 94 on the retaining ring 76 is abuttable to a shoulder 96 at the axially opposite extremity of the receptacle 88. As the actuator component 38 is moved from its first position into its second position of FIG. 10, the shoulder 88 abuts the shoulder 94 on the retaining ring 76. As a result, the actuator component 38 is confined by the retaining ring 76 to movement consistently in a predetermined axial range relative to the nut 14 between its first position and its second position.

With the connecting assembly 42 connected to the cable 18 and the actuator component 38 in its first position, the connecting assembly 42 can be aligned as in FIG. 8 relative to the second connector 20'. In FIG. 8, the connectors 12, 20' are in a separated state with the axis 52 of the connecting assembly 42 aligned with a central axis 98 on the second connector 20'.

By then moving the first and second connectors 12, 20' axially towards each other, the internal threads 44 on the nut 14 can be initially engaged with external threads 100 on the port 26. This represents a preliminary joined state for the first and second connectors 12, 20'. By then tightening the nut 14 to the port 26, the first and second connectors 12, 20' are changed into a joined operative state, wherein the first and second connectors 12, 20' are secured together and at least one conductive path is defined through the joined first and second connectors 12, 20' between the cable 18 and the port 26, through the electrical component(s) 16, 24'.

In a preferred form, the actuator component 38 has a receptacle 102 that is configured to make keyed connection with the polygonally-shaped surface portion 48 of the nut 14. The receptacle 102 may be bounded by a surface assembly 104 that is complementary in shape to the polygonally-shaped surface portion 48. Alternatively, any cooperating arrangement that would effect keying between the nut 14 and actuator component 38 is contemplated. Through this keyed connection, the nut 14 follows rotational movement of the actuator component 38 around the central axis 52. The receptacle 102 has a sufficient axial extent that keyed engagement will be maintained between the actuator component 38 and nut 14 with the actuator component 38 in both its first and second positions.

In this embodiment, the outer surface 106 of the actuator component 38 has peripherally spaced flats 108 that cooperatively produce a polygonal shape that can be engaged either by hand or by a conventional wrench to effect turning of the actuator component 38.

With the system in the FIG. 9 state, the sealing portion 34 of the sealing subassembly 32 resides in axial coincidence with the radially outwardly facing surface 40 on the port 26. While the surface 40 is shown as smooth, it could be threaded or otherwise configured.

As seen in FIG. 6, the sealing portion 34, as viewed in cross section, is bounded by a "V", which "V" opens radially outwardly. The "V" is defined by surface portions 110, 112 that converge to an apex 114.

With the construction of the sealing subassembly 32 shown, a hinge 116 is defined at a region between the first and second parts 64, 66 at which the first part 64 is allowed to be bent radially inwardly relative to the second part 66, as indicated by the arrow 117. The hinge 116 bends at a fulcrum defined at the outer corner 118 of the nut 14 at the nut end 74.

In a preferred form, the apex 114 defines an effective inner diameter D (FIG. 9) for the sealing subassembly 32 that is greater than that D1 (FIG. 8) of the port surface 40, whereby in the FIG. 9 arrangement, there is a slight circumferential, radial gap G between the apex 114 and surface 40. Preferably, this diameter D is greater than the diameter for the entire axial extent of the port 26 that the sealing subassembly 32 is required to pass over, regardless of its profile. With this arrangement which is preferred but not required, there is no interference between the sealing subassembly 32 and port 26 as the system is changed from the state in FIG. 8 to that in FIG. 9, wherein the apex 114 aligns over the surface 40.

Figure 10:
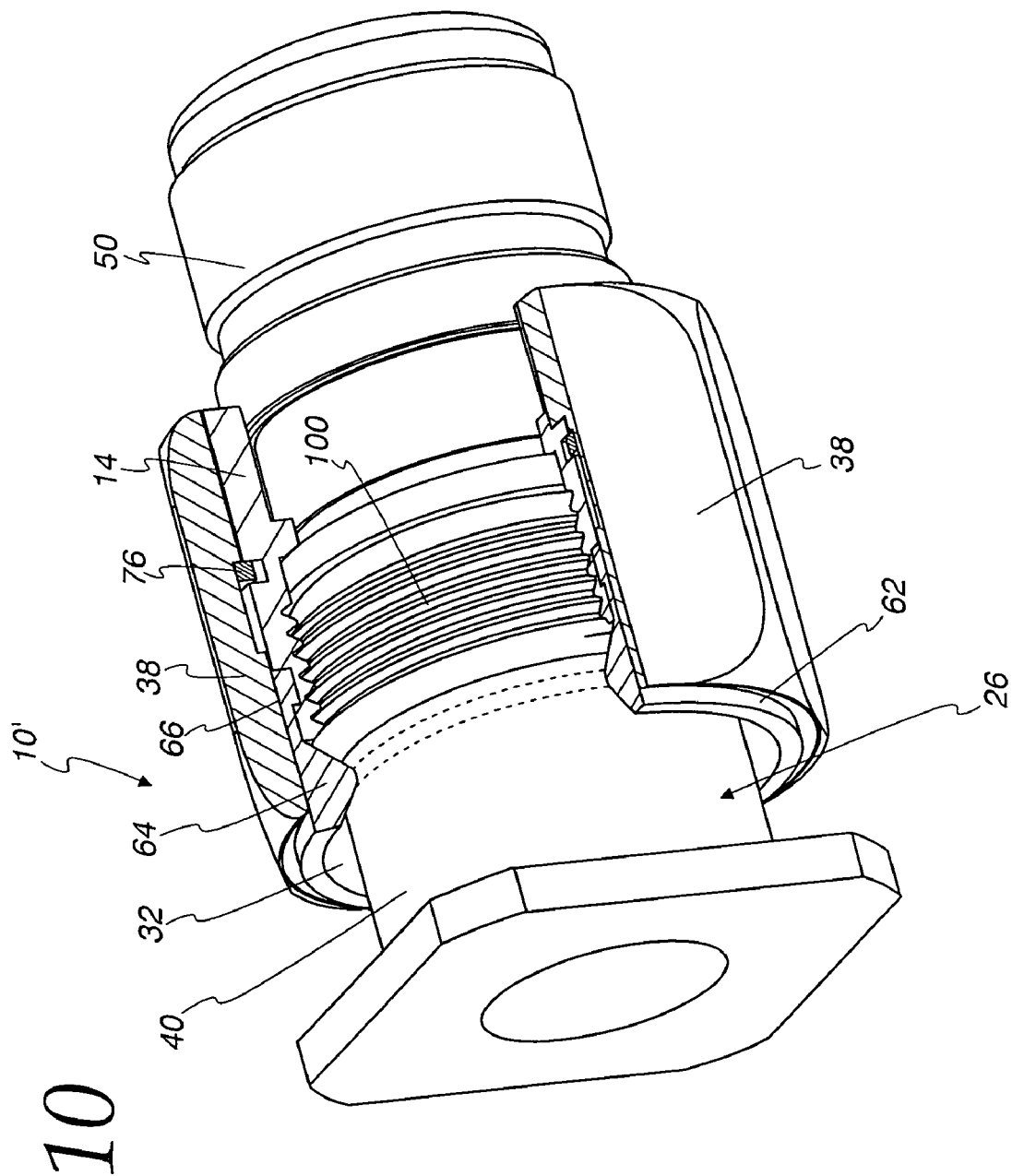
FIG. 10 is a view as in FIG. 9 wherein the actuator component has been repositioned to change the sealing subassembly into a sealing state.
Figure 11:
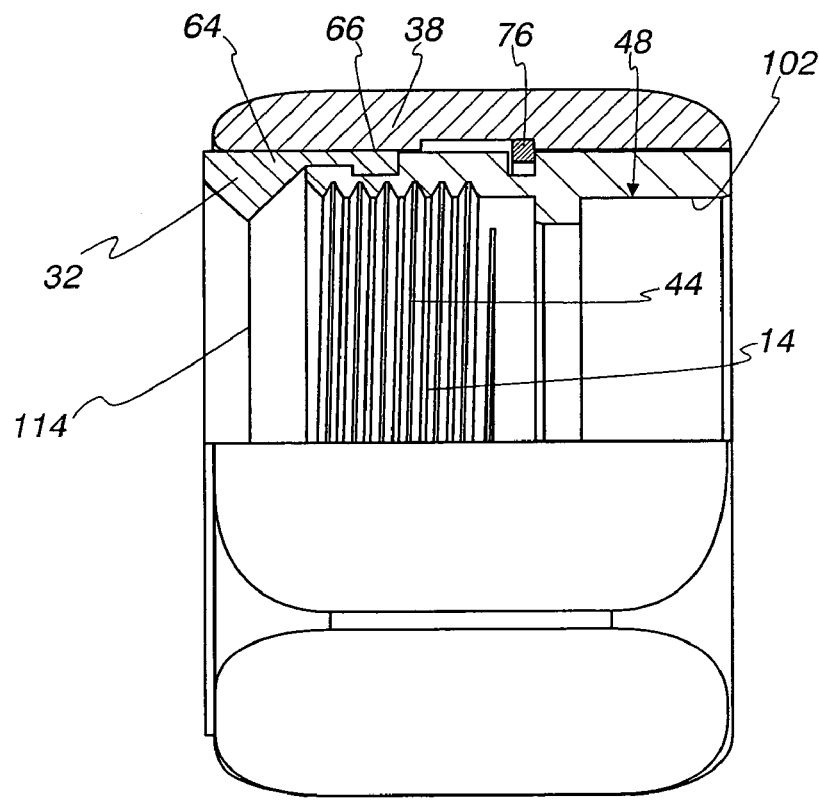
FIG. 11 is a view as in FIG. 6 with the sealing subassembly in the sealing state.
Figure 12:
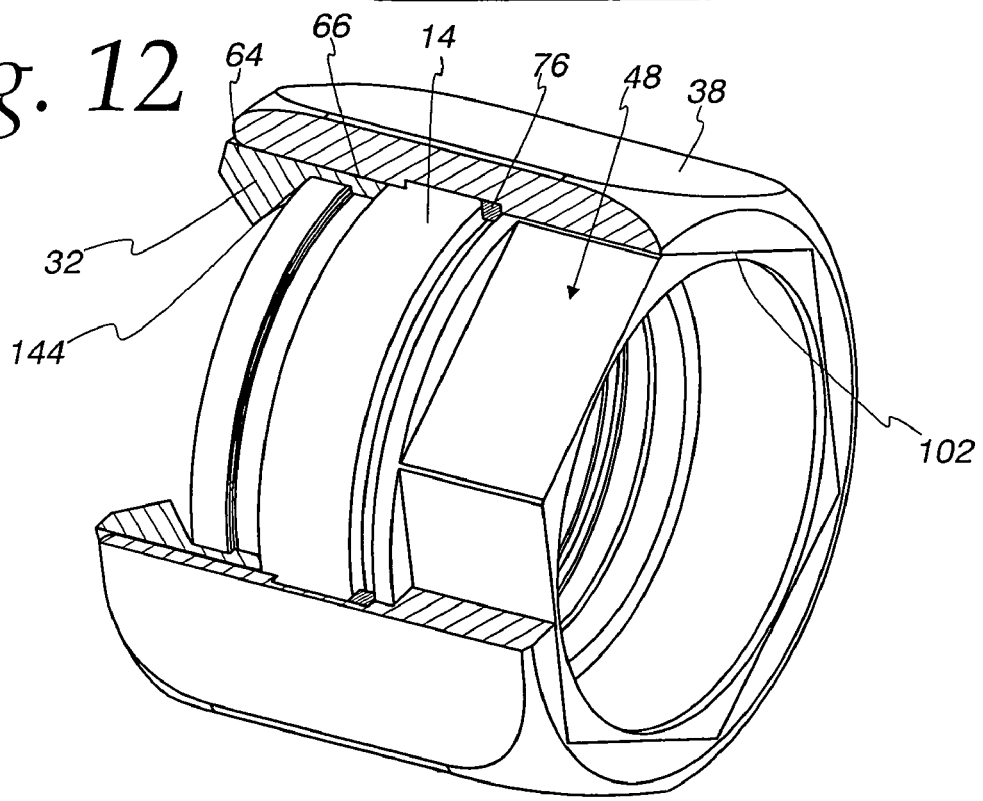
FIG. 12 is a view as in FIG. 7 with the sealing subassembly in the sealing state.

Once the FIG. 9 state is realized, the actuator component 38 can be shifted axially in a straight line to be changed from its first position of FIG. 8 into its second position of FIGS. 10 and 11. As this occurs, the leading edge 86 of the actuator component 38 bears against a ramp surface 120 to progressively bend the first part 64 radially inwardly to thereby reduce the effective diameter of the sealing portion 34. The apex 114 on the sealing portion 34 initially moves from a radially spaced relationship to make line contact with the surface 40, continuously therearound. The contact area progressively enlarges as the second part 66 bends radially inwardly and is captively compressed and deformed between the inside surface 84 of the actuator component 38, adjacent to the leading edge 86, and the port surface 40. This enhancing sealing action is facilitated by making the first part 64 of the sealing subassembly 32 of progressively increasing thickness between the hinge 116 and the axial end 122. By reason of this configuration, the axial contact width, and sealing pressure, between the sealing portion 34 and port surface 40, progressively increase proportionately to a degree of compression of the first part 64 between the actuator component 38 and the port surface 40.

Ideally, the sealing subassembly 32, and at least the first part 64 thereof, is made from sufficiently resilient and soft material that will allow the sealing portion 34 to be changed over a significant range of diameters to thereby accommodate different profiles and sizes of components. Thus, a relatively universal construction can be made for the sealing subassembly 32 that will effectively establish and maintain a high integrity seal around the surface engaged thereby.

At the same time, the second part 66 of the sealing subassembly 32 is preferably compressed sealingly between the nut 14 and actuator component 38 to establish a positive seal that avoids ingress of moisture/matter between the leading edge 86 of the actuator component 38 and the nut 14.

While in a preferred form, the system is configured as shown in FIG. 8 preparatory to joining the connectors 12, 20', it is also possible to configure the sealing assembly 30 so that it can be slid axially into the FIG. 8 position after the nut 14 is tightened to the port 26. This obviates the need to key the nut 14 and actuator component 38 together for purposes of turning the nut 14 to effect tightening thereof on a cooperating connector.

Figure 13:
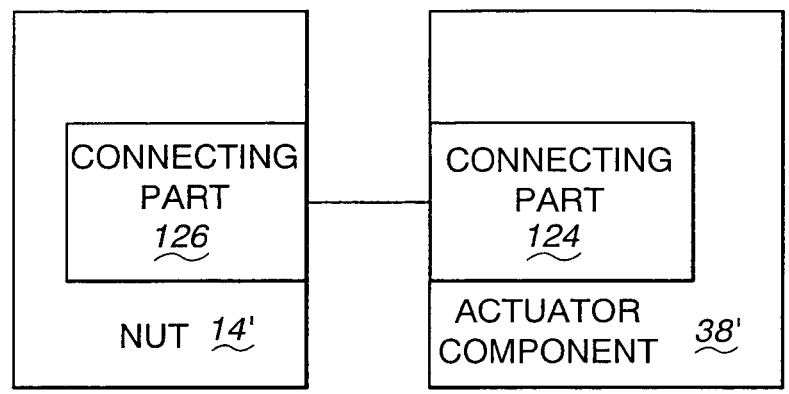
FIG. 13 is a schematic representation of a sealing assembly, according to the invention, wherein an actuator/actuator component and nut are joined through cooperating connecting parts.

While the actuator component 38 is shown to be guided axially by the nut 14 in a straight line translatory path between its first and second positions, other cooperation between these components is contemplated. For example, as shown in FIG. 13, a generic actuator component 38', corresponding to the actuator component 38, may be moved guidingly relative to the nut 14' through cooperating connecting parts 124, 126, respectively on these components, that apart from cooperating sliding surfaces, described above, may be cooperating threads, cooperating bayonet connecting parts, or any other type of connecting part known to those in the art. Other retaining structure might be incorporated to set a predetermined relationship, such as cooperating detents, latch components, etc. Components with a locking feature may be used for purposes of security.

Figure 14:
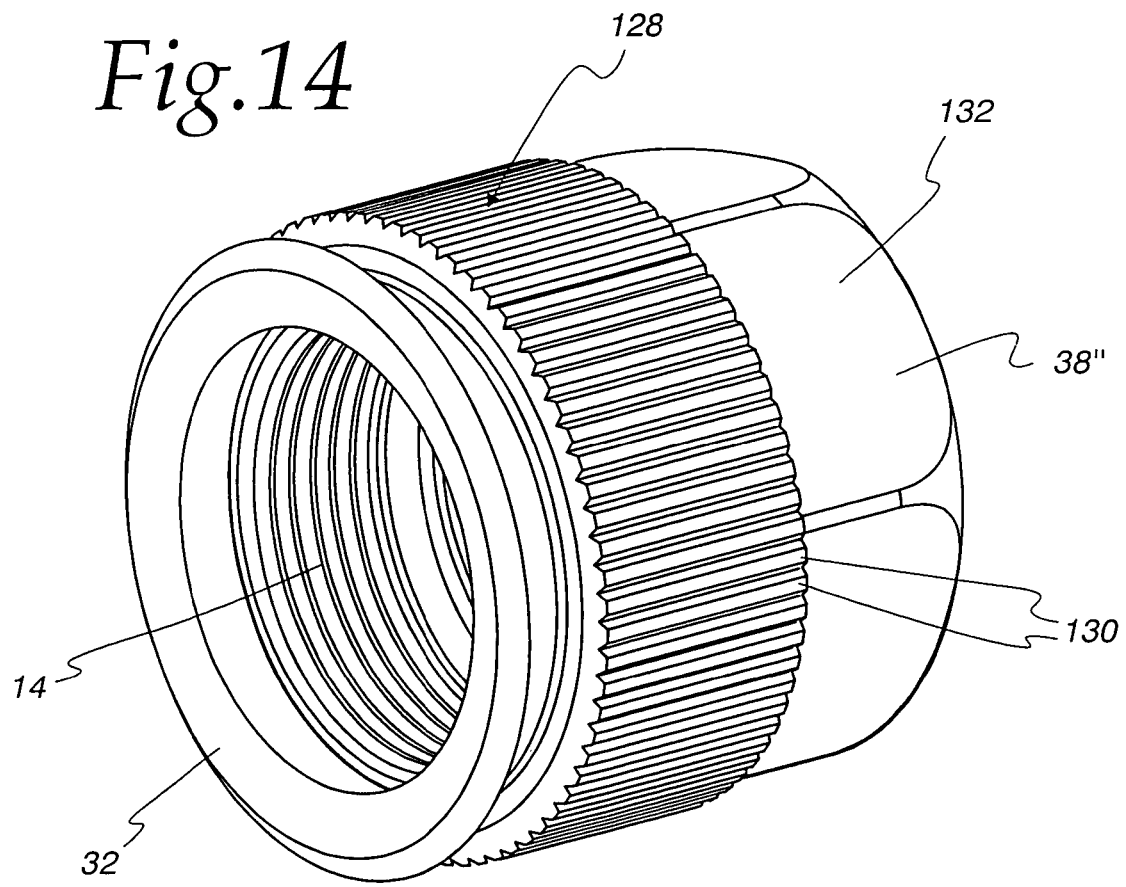
FIG. 14 is a view as in FIG. 5 with corresponding components in the same state and with a modified form of actuator/actuator component including a knurled portion to facilitate gripping.

In FIG. 14, a further modified form of actuator component is shown at 38" with the sealing subassembly 32 and nut 14 operatively joined in a manner corresponding to that for the actuator component 38, sealing component 32, and nut 14 in FIG. 5. The only structural and functional distinction between the structures shown in FIGS. 5 and 14 is that the actuator component 38" has a knurled outer surface portion at 128, defined by a plurality of raised axially extending ribs 130 equidistantly spaced fully around the circumference of the surface portion. The knurled surface portion 128 facilitates hand gripping and turning as well as axial shifting of the actuator component 38". Thus, at least preliminary hand tightening of the nut 14 can be accomplished by manipulating the actuator component 38 through two or more user fingers gripping the knurled outer surface portion 128. The surface portion 132 is flattened to produce a polygonal shape engagable by a conventional wrench.

A modified form of connecting assembly is shown at 42' in FIGS. 15-19. The connecting assembly 42' is depicted in association with the connector 20', as shown in earlier Figures, with the connector 20' defining the port 26 with the associated electrical component(s) 24'.

The connecting assembly 42' differs from the connecting assembly 42 in two respects. First of all, the connecting assembly 42' incorporates a boot assembly 140. Secondly, the actuator component 38''' has an outer surface 142 with a different configuration to accommodate the boot assembly 140. In all other respects, the connecting assembly 42' cooperates with the cable 18 and second connector 20' in the same manner as described for the connecting assembly 42.

The outer surface 142 on the actuator component 38''' has a uniform diameter surface portion 144, over approximately half of the axial extent of the actuator component 38''', and a polygonally-shaped surface portion 146 over its other half. The configuration of the outer surface 142 is designed to cooperate with a receptacle 148 defined by a body 150 on the boot assembly 140.

The receptacle 148 has a stepped diameter through bore 152 with: a) a small diameter portion 154 that closely sealingly engages fully around the outside surface 156 of the cable 18; b) an intermediate diameter portion 158 that accommodates the polygonally-shaped surface portion 146 on the actuator component 38'''; and c) a large diameter portion 160 that accommodates the uniform diameter surface 144 on the actuator component 38'''.

Figure 15:
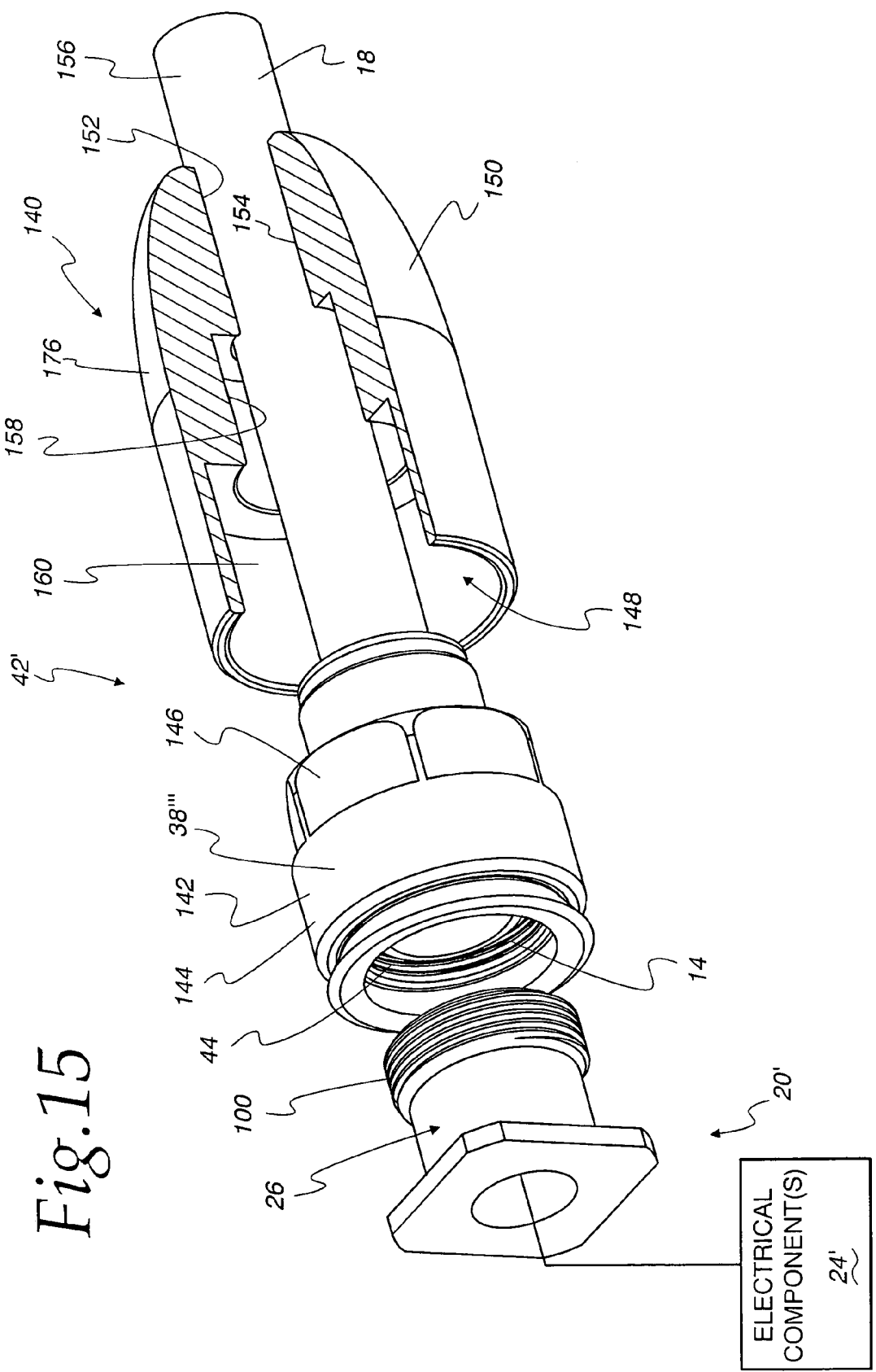
FIG. 15 is an exploded, partially broken away, perspective view of a connecting assembly, according to the present invention, including a separate connecting assembly, as in FIG. 8, with a modified form of actuator/actuator component to accommodate a boot assembly, with the boot assembly shown in a pre-assembly position.
Figure 16:
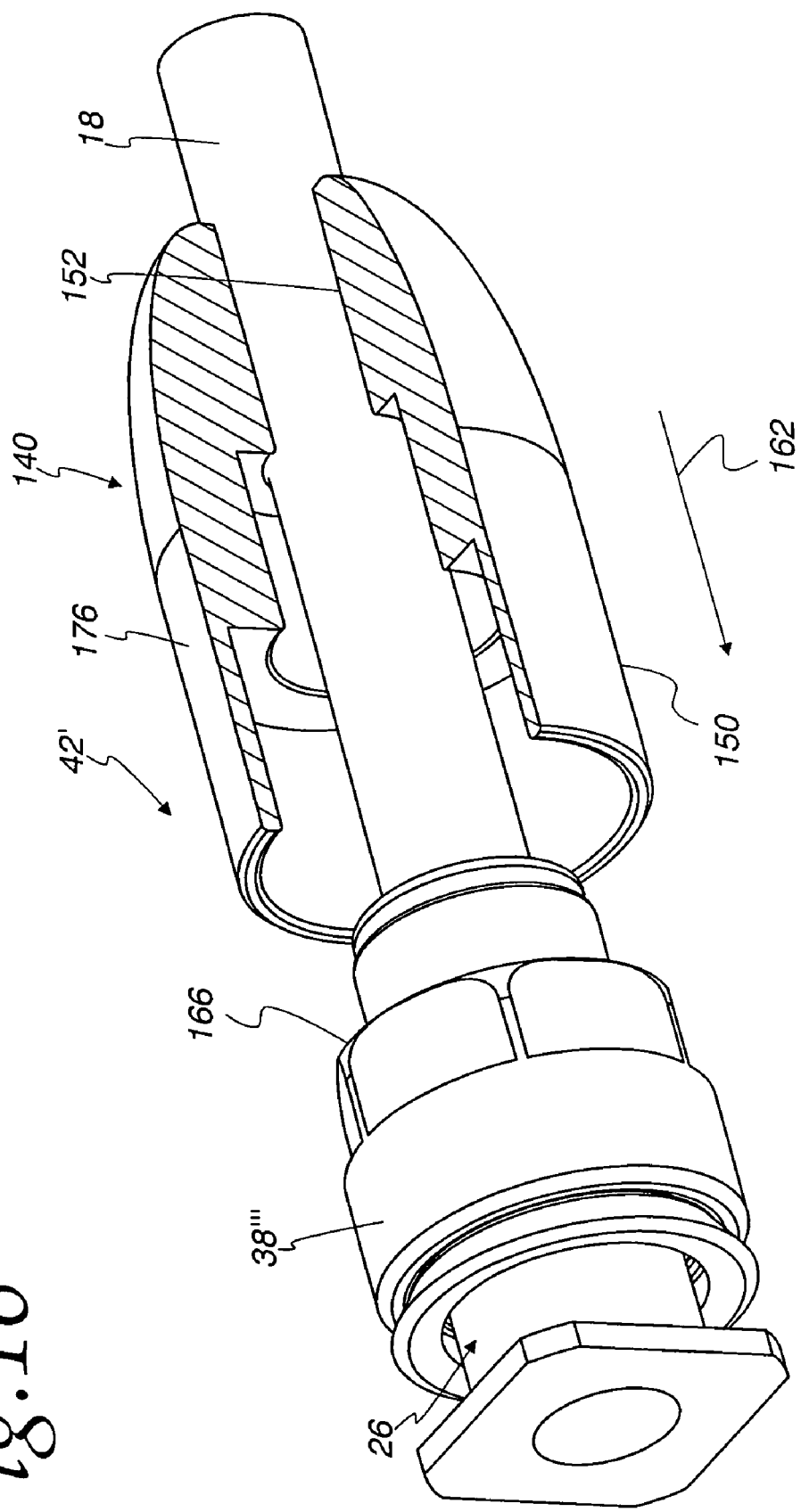
FIG. 16 is a view as in FIG. 15 with a connector on the connecting assembly and a connector defining a port threadably connected and with the boot assembly remaining in the FIG. 15 position and the sealing subassembly in the pre-assembled state.

The connecting assembly 42' can be changed from the FIG. 15 state into the FIG. 16 state by engaging the internal threads 44 on the nut 14 with the external threads 100 on the port 26 and turning the nut 14 by hand or through the polygonally-shaped surface portion 146 with a wrench to generate the desired torque to tighten the connection to the desired degree. Thereafter, the boot assembly 140 is shifted in the direction of the arrow 162 in FIG. 16 from the separated, pre-assembly position in FIG. 16 up to the FIG. 17 actuating/assembly position, wherein an axially facing shoulder 164, defined at a step between the intermediate and large diameter portions 158, 160 of the through bore 152, abuts to the axial nut end 166. In this position, the inside surface portion 168, bounding the large diameter portion 160 of the through bore 152, sealingly engages the uniform surface diameter portion 144 on the actuator component 38'''. An inside surface portion 170, bounding the intermediate diameter portion 158, sealingly surrounds an outer surface portion 172 on the body 50 to effect a seal therearound. An inside surface portion 174, bounding the small diameter portion 154 of the through bore 152, extends sealingly around the cable 18.

In addition to the sealing that is afforded by the extended axial dimension of the boot assembly 140, this construction presents a large outer surface 176 on the body 150 that is comfortably manipulated and facilitates positive hand grasping to facilitate axial shifting of the boot assembly 140. By grasping and moving the boot assembly 140 in the direction of the arrow 178 in FIG. 17, the shoulder 164 bears upon the actuator component 38''', thereby to allow shifting of the same from a first position in FIG. 17 into a second position in FIG. 18, whereupon the sealing subassembly 32 is changed from its pre-assembled state into its sealing state, as respectively shown in these same Figures.

In the event that there is a need to access the connection at the port 26, the boot assembly 140 can be axially moved in the direction of the arrow 180 in FIG. 19, from the FIG. 18 position, to expose the same similarly as in FIG. 16, but with the sealing subassembly 32 in the sealing state. Thus, the boot assembly 140 provides an additional sealing aspect and also facilitates repositioning of the actuator component 38'''.

As shown in FIG. 20, a modified form of the boot assembly 140' may perform an additional function. In FIG. 20, cooperating locking components 182, 184 are shown on the boot assembly 140' and a connector 186 with which a connector, with which the boot assembly 140' is associated, is joined. Through the locking components 182, 184, a relationship for the boot assembly 140', corresponding to that for the boot assembly 140 in FIG. 18, may be permanently maintained so as to prohibit access to the connection as might permit tampering or signal interference or theft. Provision might be made to limit access to authorized personnel by incorporating a safety feature into the locking components 182, 184 which allows only authorized personnel to effect release of the boot assembly 140'.

It should also be noted that supplementary sealing structure might also be utilized in conjunction with the inventive structure. For example, heat shrinkable sealing components, tape, O-rings, rubber boots, etc., might be incorporated.

Figure 21:
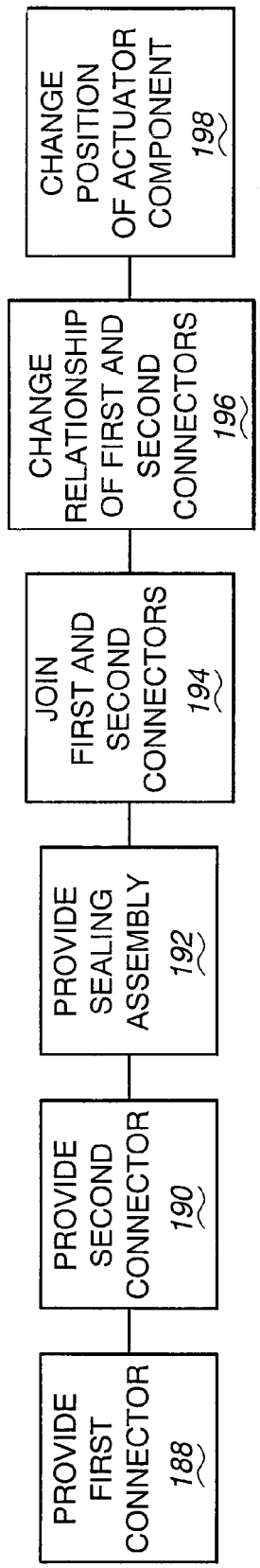
FIG. 21 is a flow diagram representation of a method for joining first and second connectors, according to the present invention.

With the structure described above, first and second connectors, with virtually an unlimited number of different constructions, may be connected through a method as depicted in block diagram form in FIG. 21.

As shown at block 188, a first connector is provided with a first cable length operatively connected thereto. As shown at block 190, a second connector with a central axis and a radially outwardly facing surface is provided. As shown at block 192, a sealing assembly is provided. As shown at block 194, the first and second connectors are joined together into a preliminary joined state. As shown at block 196, the relationship of the first and second connectors is changed to a joined operative state, wherein the first and second connectors are secured together. As shown at block 198, the actuator component is changed from its first position into its second position, thereby causing a part of the sealing subassembly to bend to thereby cause a sealing portion on the part of the sealing subassembly to be reduced from a first effective diameter to a second effective diameter smaller than the first effective diameter. This may bring the sealing portion from a radially spaced relationship into sealing engagement with a radially outwardly facing surface.

The foregoing disclosure of specific embodiments is intended to be illustrative of the broad concepts comprehended by the invention.

The invention claimed is:

1. A sealing assembly for a coaxial cable connector, the connector having at one end a threaded nut for threaded engagement with an RF port to thereby removably attach the coaxial cable connector to the RF port, the sealing assembly comprising:

a sealing subassembly changeable between a pre-assembled state and a sealing state, the sealing subassembly having spaced ends with an engagement portion at one of the sealing subassembly ends and a sealing portion at the other sealing subassembly end, the engagement portion mounted to the nut; and an actuator mounted on an external surface of the nut, wherein axial advancement of the actuator changes the sealing subassembly from the pre-assembled state into the sealing state and thereby causes the sealing portion to compress radially inwardly around the RF port.

2. The sealing assembly for a coaxial cable connector according to claim 1 wherein the sealing portion has a surface bounded by a radially outwardly opening "V" with the sealing subassembly viewed in cross section.

3. The sealing assembly for a coaxial cable connector according to claim 1 in combination with a coaxial cable length operatively connected to the connector.

4. The sealing assembly for a coaxial cable connector according to claim 1 wherein the actuator is moved axially along a central axis between first and second positions to change the sealing subassembly between the pre-assembled state and the sealing state, and the actuator and nut are maintained together and are movable relative to each other axially to allow the actuator to be changed between the first and second positions.

5. The sealing assembly for a coaxial cable connector according to claim 4 wherein the nut and actuator are keyed to each other to limit relative movement between the nut and actuator around the central axis, thereby allowing the actuator to be turned around the central axis to thereby turn the nut around the central axis.

6. The sealing assembly for a coaxial cable connector according to claim 4 wherein the nut and actuator are guided one against the other as the actuator is moved relative to the nut between the first and second positions and there are one of: a) cooperating threads on the nut and actuator that allow the nut and actuator to be turned relative to each other around the central axis to effect relative axial movement therebetween; and b) cooperating surfaces on the nut and actuator through which the nut and actuator can be guided slidingly against each other in a straight line generally parallel to the central axis.

7. The sealing assembly for a coaxial cable connector according to claim 1 wherein the sealing subassembly comprises a hinge at which the sealing subassembly can bend to cause a first part of the sealing subassembly, on which the sealing portion is defined, to move radially inwardly relative to a second part of the sealing subassembly, on which the engagement portion is defined, as the sealing subassembly is changed from the pre-assembled state into the sealing state.

8. The sealing assembly for a coaxial cable connector according to claim 7 wherein there are cooperating connecting parts on the second part of the sealing subassembly and nut that allow the sealing subassembly and nut to be press fit, and maintained, together.

9. The sealing assembly for a coaxial cable connector according to claim 7 wherein the actuator surrounds the first part of the sealing subassembly so that the first part of the sealing subassembly is captive between the actuator and a radially outwardly facing surface on the RF port.

10. The sealing assembly for a coaxial cable connector according to claim 9 wherein the radially outwardly facing surface has a first diameter, the sealing portion has a second diameter that is greater than the first diameter with the sealing subassembly in the pre-assembled state so that the sealing portion can be moved axially relative to the radially outwardly facing surface without any interference between the sealing portion and radially outwardly facing surface with the sealing subassembly in the pre-assembled state.

11. A sealing assembly for a coaxial cable connector, the connector having at one end a threaded nut for removable attachment to an RF port, the sealing assembly comprising:
  a sealing subassembly changeable between a pre-assembled state and a sealing state, the sealing subassembly having at one end an engagement portion and at its other end a sealing portion, the engagement portion mounted to the nut; and
  an actuator mounted on an external surface of the nut,
  wherein axial advancement of the actuator changes the sealing subassembly from the pre-assembled state into the sealing state and thereby causes the sealing portion to compress radially inwardly around the RF port,
  wherein the actuator is moved axially between first and second positions to change the sealing subassembly from the pre-assembled state into the sealing state,
  the connecting assembly further comprising a boot assembly that is engagable with the actuator and manipulable to thereby move the actuator from the first position into the second position.

12. The sealing assembly for a coaxial cable connector according to claim 11 wherein the boot assembly is configured to sealingly receive a part of the actuator and seal directly against and around a cable connected to the connector.

13. A sealing assembly for a connecting assembly for coaxial cable, the connecting assembly comprising a first connector that can be electrically connected to a first length of coaxial cable and having a central axis, the first connector comprising an internally threaded nut that can be engaged with external threads on a second connector to establish electrical connection between a first length of coaxial cable electrically connected to the first connector and one of: a) a second length of coaxial cable; or b) a port defined by the second connector, the sealing assembly comprising:
  a sealing subassembly that is changeable between pre-assembled and sealing states and defines a sealing portion; and
  an actuator component that is movable guidingly axially relative to the first nut between first and second positions,
  the actuator component, as an incident of moving between the first and second positions, changing the sealing subassembly from the pre-assembled state into the sealing state by bending a part of the sealing subassembly and thereby changing an effective diameter of the sealing portion that is engageable with a radially outwardly facing surface on a second connector to which the first connector is joined;
  wherein the sealing assembly comprises a hinge at which the sealing subassembly bends to cause a first part of the sealing subassembly, on which the sealing portion is defined, to move radially inwardly relative to a second part of the sealing subassembly, as the sealing subassembly is changed from the pre-assembled state into the sealing state.

14. The sealing assembly for a coaxial cable connecting assembly according to claim 13 wherein the nut and actuator component are keyed to each other to limit relative movement between the nut and actuator component around the central axis, thereby allowing the actuator component to be turned around the central axis and to thereby turn the nut around the central axis to facilitate threaded engagement of the nut with a second connector.

15. The sealing assembly for a coaxial cable connecting assembly according to claim 13 wherein there are cooperating connecting parts on the sealing subassembly and nut that allow the sealing subassembly and nut to be press fit, and maintained, together.

16. The sealing assembly for a coaxial cable connecting assembly according to claim 13 wherein the sealing portion has a surface bounded by a radially outwardly opening "V" with the sealing subassembly viewed in cross section.

17. The sealing assembly for a coaxial cable connecting assembly according to claim 13 wherein the nut and actuator component are guided one against the other as the actuator component is moved relative to the nut between the first and second positions and there are one of: a) cooperating threads on the nut and actuator component that allow the nut and actuator components to be turned relative to each other around the central axis to effect relative axial movement therebetween; and b) cooperating surfaces on the nut and actuator component through which the nut and actuator component can be guided slidingly against each other in a straight line generally parallel to the central axis.

18. A sealing assembly for a connecting assembly for coaxial cable, the connecting assembly comprising a first connector that can be electrically connected to a first length of coaxial cable and having a central axis, the first connector comprising an internally threaded nut that can be engaged with external threads on a second connector to establish electrical connection between a first length of coaxial cable electrically connected to the first connector and one of: a) a second length of coaxial cable; or b) a port defined by the second connector, the sealing assembly comprising:
  a sealing subassembly that is changeable between pre-assembled and sealing states and defines a sealing portion; and
  an actuator component that is movable guidingly axially relative to the first nut between first and second positions, the actuator component, as an incident of moving between the first and second positions, changing the sealing subassembly from the pre-assembled state into the sealing state by bending a part of the sealing subassembly and thereby changing an effective diameter of the sealing portion that is engageable with a radially outwardly facing surface on a second connector to which the first connector is joined, wherein the connecting assembly further comprises a boot assembly that is engageable with the actuator component and manipulable to thereby move the actuator component relative to the nut from the first position into the second position.

19. The sealing assembly for a coaxial cable connecting assembly according to claim 18 wherein the boot assembly is configured to sealingly receive a part of the actuator component and seal directly against and around a first length of coaxial cable electrically connected to the first connector.

20. A method of joining first and second connectors, the method comprising the steps of:

providing a first connector with a first cable length operatively connected thereto;

providing a second connector with a central axis and a radially outwardly facing surface;

providing a sealing assembly;

joining the first and second connectors together into a preliminary joined state;

changing the relationship of the first and second connectors to a joined operative state wherein the first and second connectors are secured together; and changing the actuator component from a first position into a second position and thereby causing a part of the sealing subassembly to bend at a hinge location to thereby cause a sealing portion on the part of the sealing subassembly to be reduced from a first effective diameter to a second effective diameter, smaller than the first effective diameter, thereby to bring the sealing portion from a radially spaced relationship into sealing engagement with the radially outwardly facing surface.

21. The method of joining first and second connectors according to claim 20 wherein the second connector has an effective outer diameter along an axial extent over which the sealing portion passes as the first and second connectors are changed from a separated state into the joined operative state and with the actuator in the first position the first effective diameter of the sealing portion is greater than the effective outer diameter of the second connector over the entire axial extent.

22. The method of joining first and second connectors according to claim 20 wherein the actuator component is changed from the first position into the second position after the first and second connectors are changed into the joined operative state.

23. The method of joining first and second connectors according to claim 22 wherein the first connector comprises a threaded nut and the step of changing the actuator component from a first position into a second position comprises moving the actuator component guidingly along an external surface of the nut.

* * * * *